United States Patent
Chachek

(10) Patent No.: US 11,948,376 B2
(45) Date of Patent: *Apr. 2, 2024

(54) METHOD, SYSTEM, AND DEVICE OF GENERATING A REDUCED-SIZE VOLUMETRIC DATASET

(71) Applicant: REALMOTION INC., New York, NY (US)

(72) Inventor: Amit Chachek, Closter, NJ (US)

(73) Assignee: REALMOTION INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,846

(22) Filed: Jun. 25, 2023

(65) Prior Publication Data

US 2023/0334881 A1    Oct. 19, 2023

Related U.S. Application Data

(63) Continuation of application No. 18/059,099, filed on Nov. 28, 2022, now Pat. No. 11,721,114, which is a
(Continued)

(51) Int. Cl.
*G06T 17/20*    (2006.01)
*G06F 18/22*    (2023.01)
(Continued)

(52) U.S. Cl.
CPC .......... *G06V 20/653* (2022.01); *G06F 18/22* (2023.01); *G06T 7/20* (2013.01); *G06T 13/40* (2013.01);
(Continued)

(58) Field of Classification Search
None
See application file for complete search history.

(56) References Cited

U.S. PATENT DOCUMENTS 9,036,898 B1 *   5/2015  Beeler ............... G06T 19/20
                                                           382/154
2009/0284529 A1 * 11/2009 De Aguiar ........... G06T 7/251
                                                           345/474

(Continued)

OTHER PUBLICATIONS

Alvaro Collet, Ming Chuang, Pat Sweeney, Don Gillett, Dennis Evseev, David Calabrese, Hugues Hoppe, Adam Kirk, Steve Sullivan, "High-Quality Streamable Free-Viewpoint Video", Aug. 13, 2015, ACM, ACM Transactions on Graphics, vol. 34, Issue 4, Article 69.*

(Continued)

*Primary Examiner* — Robert Bader
(74) *Attorney, Agent, or Firm* — AlphaPatent Associates Ltd.; Daniel J. Swirsky

(57) ABSTRACT

Device, system, and method of generating a reduced-size volumetric dataset. A method includes receiving a plurality of three-dimensional volumetric datasets that correspond to a particular object; and generating, from that plurality of three-dimensional volumetric datasets, a single uniform mesh dataset that corresponds to that particular object. The size of that single uniform mesh dataset is less than ¼ of the aggregate size of the plurality of three-dimensional volumetric datasets. The resulting uniform mesh is temporally coherent, and can be used for animating that object, as well as for introducing modifications to that object or to clothing or garments worn by that object.

20 Claims, 7 Drawing Sheets

Related U.S. Application Data continuation of application No. 17/478,919, filed on Sep. 19, 2021, now Pat. No. 11,514,646, which is a continuation of application No. 16/773,994, filed on Jan. 28, 2020, now Pat. No. 11,127,206.

(60) Provisional application No. 62/797,961, filed on Jan. 29, 2019.

(51) Int. Cl.

| | | |
|---|---|---|
| *G06T 7/20* | (2017.01) | |
| *G06T 13/40* | (2011.01) | |
| *G06T 15/08* | (2011.01) | |
| *G06T 17/10* | (2006.01) | |
| *G06T 19/20* | (2011.01) | |
| *G06V 10/75* | (2022.01) | |
| *G06V 20/64* | (2022.01) | |
| *G06V 40/20* | (2022.01) | |

(52) U.S. Cl.
CPC .............. *G06T 15/08* (2013.01); *G06T 17/10* (2013.01); *G06T 17/20* (2013.01); *G06T 17/205* (2013.01); *G06T 19/20* (2013.01); *G06V 10/754* (2022.01); *G06V 40/23* (2022.01); *G06T 2200/08* (2013.01)

(56) References Cited

U.S. PATENT DOCUMENTS

| | | | | |
|---|---|---|---|---|
| 2011/0148875 | A1* | 6/2011 | Kim ........................ | G06T 13/40 345/420 |
| 2012/0154393 | A1* | 6/2012 | Lee ......................... | G06T 7/251 345/419 |
| 2015/0178988 | A1* | 6/2015 | Montserrat Mora ... | G06T 17/20 345/420 |
| 2015/0286872 | A1* | 10/2015 | Medioni .................... | G06T 7/20 382/103 |
| 2016/0293218 | A1* | 10/2016 | Hanis ...................... | G11B 27/28 |
| 2017/0024930 | A1* | 1/2017 | Chuang .................... | G06T 7/251 |
| 2018/0012407 | A1* | 1/2018 | Chuang .................... | G06T 13/40 |
| 2018/0220125 | A1* | 8/2018 | Tamir ...................... | G06T 17/00 |
| 2020/0035021 | A1* | 1/2020 | Horsman .............. | G06T 15/503 |

OTHER PUBLICATIONS

Hanbyul Joo, Hyun Soo Park, Yaser Sheikh, "MAP Visibility Estimation for Large-Scale Dynamic 3D Reconstruction", Jun. 28, 2014, IEEE, Proceedings of 2014 IEEE Conference on Computer Vision and Pattern Recognition, pp. 1122-1129.*

Hanbyul Joo, Tomas Simon, Xulong Li, Hao Liu, Lei Tan, Lin Gui, Sean Banerjee, Timothy Godisart, Bart Nabbe, Iain Matthews, et al., "Panoptic Studio: A Massively Multiview System for Social Interaction Capture", Dec. 12, 2017, IEEE, IEEE Transactions on Pattern Analysis and Machine Intelligence, vol. 41, issue 1.*

Yue Luo, Jimmy Ren, Zhouxia Wang, Wenxiu Sun, Jinshan Pan, Jianbo Liu, Jiahao Pang, Liang Lin, "LSTM Pose Machines", Jun. 23, 2018, IEEE, Proceedings of 2018 IEEE/CVF Conference on Computer Vision and Pattern Recognition, pp. 5207-5215.*

Rohan Sawhney, Keenan Crane, "Boundary First Flattening", Dec. 2017, ACM, ACM Transactions on Graphics, vol. 37, No. 1, Article 5.*

Xuan Luo, Gaoming Jiang, Honglian Cong, Yan Zhao, "Cloth Simulation with Adaptive Force Model in Three-Dimensional Space", Mar. 1, 2018, Sage Journals, Journal of Engineered Fibers and Fabrics, vol. 13, Issue 1, pp. 40-46.*

Gerard Pons-Moll, Sergi Pujades, Sonny Hu, Michael J. Black, "ClothCap: Seamless 4D Clothing Capture and Retargeting", Jul. 2017, ACM, ACM Transactions on Graphics, vol. 36, Issue 4, Article 73.*

Hanbyul Joo, Tomas Simon, Yaser Sheikh, "Total Capture: A 3D Deformation Model for Tracking Faces, Hands, and Bodies", Jun. 23, 2018, IEEE, Proceedings of 2018 IEEE/CVF Conference on Computer Vision and Pattern Recognition, pp. 8320-8329.*

Joao Regateiro Marco Volino Adrian Hilton, "Hybrid Skeleton Driven Surface Registration for Temporally Consistent Volumetric Video", Sep. 8, 2018, IEEE, Proceedings of 2018 International Conference on 3D Vision (3DV), pp. 514-522.*

Thomas Ebner, Ingo Feldmann, Sylvain Renault, Oliver Schreer, Peter Eisert, "Multi-view reconstruction of dynamic real-world objects and their integration in augmented and virtual reality applications", 2017, Society for Information Display, Journal of the SID, vol. 25, issue 3, pp. 151-157.*

Edilson de Aguiar, Christian Theobalt, Sebastian Thrun, Hans-Peter Seidel, "Automatic Conversion of Mesh Animations into Skeleton-based Animations", Apr. 24, 2008, Eurographics Association, Computer Graphics Forum, vol. 27, Issue 2, pp. 389-397.*

* cited by examiner

METHOD, SYSTEM, AND DEVICE OF GENERATING A REDUCED-SIZE VOLUMETRIC DATASET

CROSS-REFERENCE TO RELATED APPLICATIONS

This application is a Continuation of U.S. Ser. No. 18/059,099, filed on Nov. 28, 2022, which is hereby incorporated by reference in its entirety; which is a Continuation of U.S. Ser. No. 17/478,919, filed on Sep. 19, 2021, now U.S. Pat. No. 11,514,646 (issued on Nov. 29, 2022), which is hereby incorporated by reference in its entirety; which is a Continuation of U.S. Ser. No. 16/773,994, filed on Jan. 28, 2020, now U.S. Pat. No. 11,127,206 (issued on Sep. 21, 2021), which is hereby incorporated by reference in its entirety; which claims benefit and priority from U.S. 62/797,961, filed on Jan. 29, 2019, which is hereby incorporated by reference in its entirety.

FIELD

The present invention is related to electronic devices and computerized systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some computing devices and electronic devices are utilized to display photographs, images, videos, animations, three-dimensional representations of objects, and other visual elements.

SUMMARY

The present invention may include, for example, systems, devices, and methods of generating and utilizing a reduced-size or compressed volumetric dataset, and/or for generating or enabling temporal-coherence uniform topology and UV atlas, particularly with regard to a volumetric three-dimensional object or model; and in turn enable to apply to such items a variety of tools, effects, graphical/visual effects, animation effects, texture effects, and/or other modifications which may be deployed or performed in an efficient manner.

The present invention may provide other and/or additional benefits or advantages.

DETAILED DESCRIPTION OF SOME DEMONSTRATIVE EMBODIMENTS

The present invention includes systems, devices, and methods that detect and/or generate and/or utilize spatial and temporal coherence within volumetric datasets; particularly in digital representations of three-dimensional objects or persons and/or their spatial movement; and particularly for generating a reduced-size dataset or a reduced-size representation that is approximately ¹/₁₀ of the data size that conventional systems require for representing such objects or persons or their spatial movement.

Figure 1:
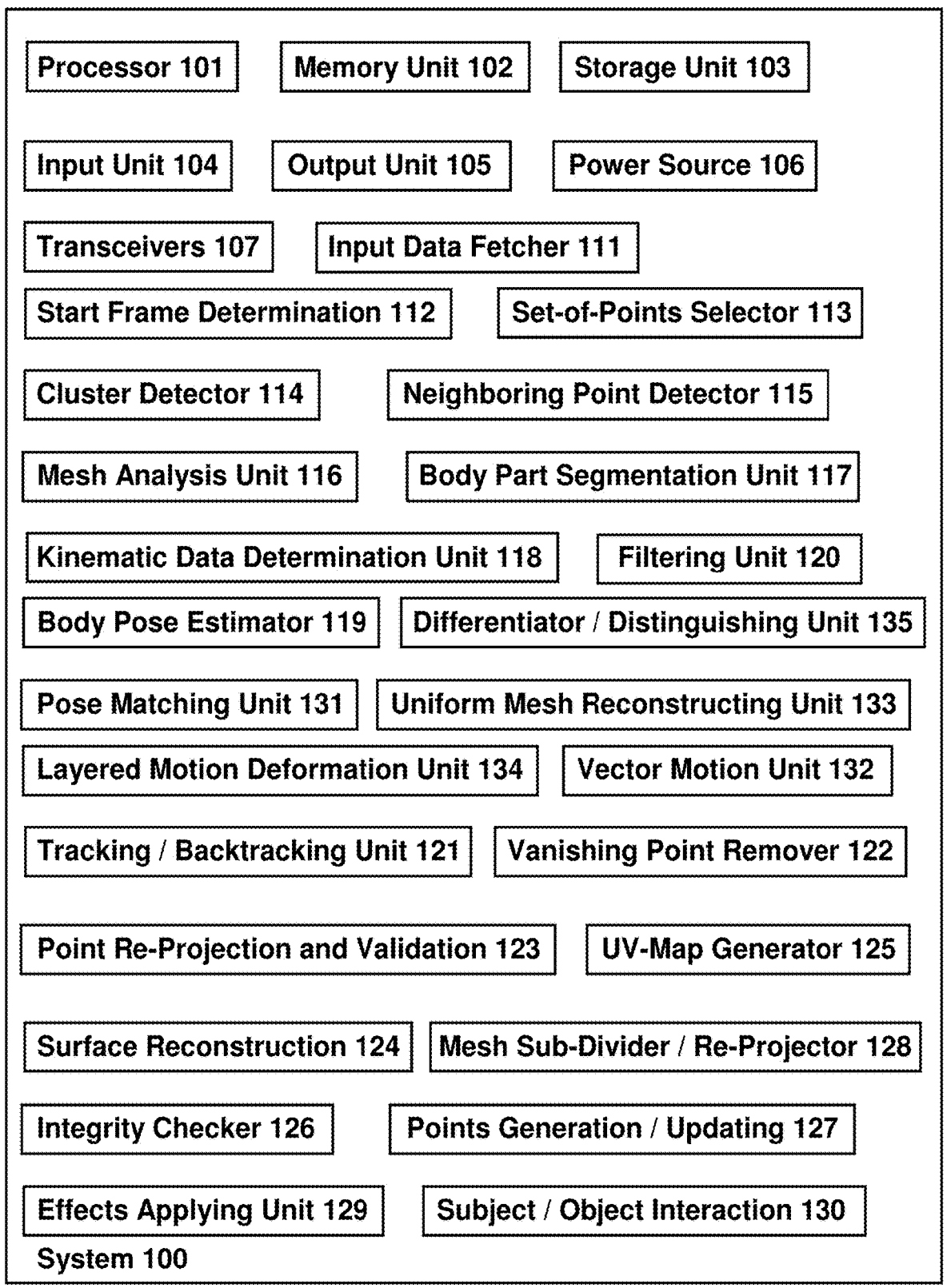
FIG. 1 is a schematic block-diagram illustration of a system, in accordance with some demonstrative embodiments of the present invention.

Reference is made to FIG. 1, which is a schematic block-diagram illustration of a system 100, in accordance with some demonstrative embodiments of the present invention. System 100 may process and convert volumetric data or datasets, for example, having temporally incohesive data, to generate a temporally coherent uniform topology and UV atlas that enables to store the original three-dimensional data by utilizing significantly smaller storage sizes, e.g., one-tenth of the original storage size together with the motion vector data and mesh topology optimization.

Figure 2:
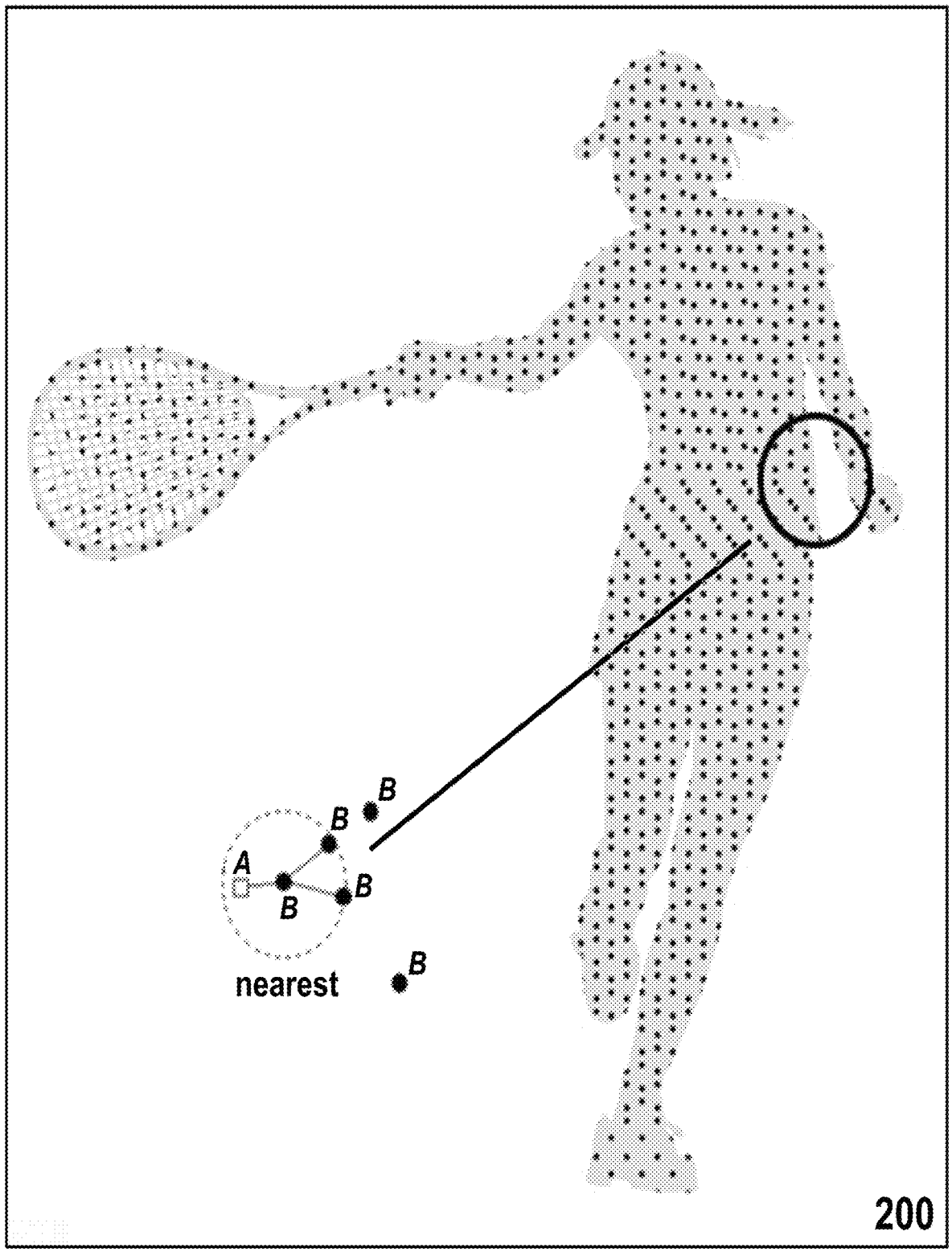
FIG. 2 is a schematic illustration of an image processed to identify nearest points for tracking purposes, in accordance with some embodiments of the present invention.
Figure 4:
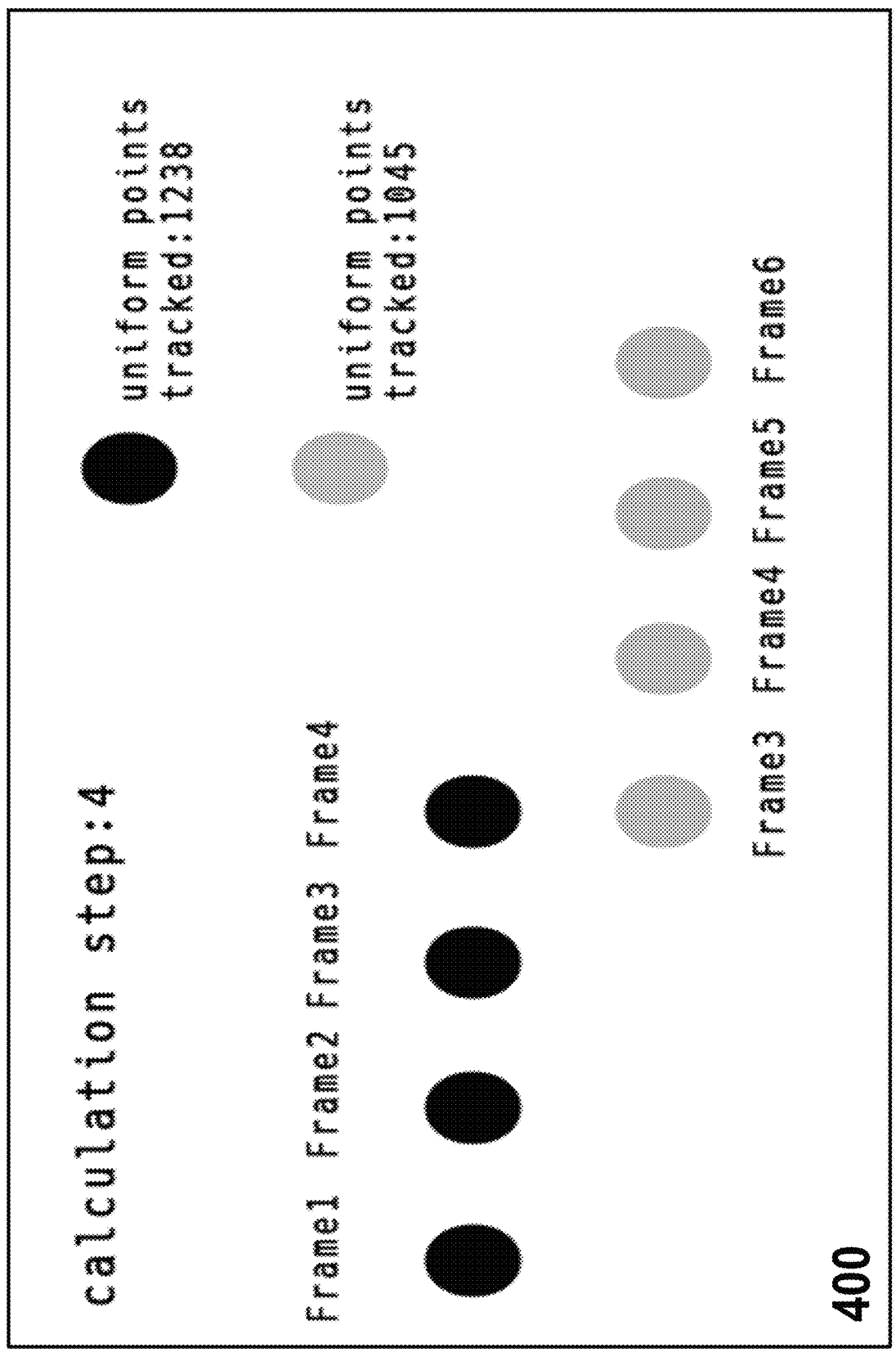
FIG. 4 is a schematic illustration of a set of data-items processed and generated, demonstrating the calculation step of tracked uniform points across frames, in accordance with some embodiments of the present invention.

The system utilizes accompanying image data optical flow points, and/or image-field vector data, and/or other data or points which may be obtained using optical flow or from analysis of images or frames and detection of vectors; which are tracked through each subsequent frame at multiple angles or multiple views; and a calculation step is performed or is determined beforehand, indicating when tracked points reset and/or what are their overlapping positions; as demonstrated in FIG. 2, which is a schematic illustration of an image 200 processed by the system to identify nearest points for tracking purposes, in accordance with some embodiments of the present invention. At such detected overlapping points, a new set of tracked points may be created and further tracked (e.g., demonstrated in FIG. 4, which is a schematic illustration of a set 400 of data-items processed and generated by the system, demonstrating the calculation step of tracked uniform points across frames, in accordance with some embodiments). This process spans the course of the specified three-dimensional animation, and creates the basis for which uniform points are generated throughout the sequence. In some embodiments, the system converts temporal incoherent three-dimensional objects to vector-based or vectorized data or to at least partially-vectorized data, thereby enabling storage size reduction as well as the generation of constant topology and UV atlas.

System 100 may comprise, for example, a hardware processor 101 (e.g., a Central Processing Unit (CPU), a Digital Signal Processor (DSP), a single-core or multiple-core processor, an Integrated Circuit (IC), an Application-Specific IC (ASIC), a controller, or the like); a memory unit 102 (e.g., Random Access Memory (RAM), Flash memory); a storage unit 103 (e.g., a Hard Disk Drive (HDD), a Solid State Drive (SDD), Flash memory); an input unit 104 (e.g., keyboard, mouse, touch-screen, touchpad); an output unit

105 (e.g., screen, touch-screen, monitor, display unit); a power source 106 (e.g., battery, power cell, connection to an electric socket); one or more transceivers 107 (e.g., Wi-Fi transceiver, cellular transceiver, Bluetooth transceiver, wired transceiver, wireless transceiver, modem, network interface card); and/or other suitable hardware components (e.g., accelerometer, gyroscope, compass unit, GPS unit), and/or software components (e.g., Operating System (OS), drivers, applications).

In a demonstrative embodiment, an Input Data Fetcher 111 receives or obtains or downloads or fetches from an external source a group or batch of three-dimensional volumetric datasets, which are then utilized as the input that system 100 processes and converts into a uniform mesh dataset. The input may be received or obtained in a variety of formats or data structures, for example, as OBJ file(s), as FBX file(s), as a set or sequence or group or batch of such files, as a sequence of frames or images represented in other formats, or the like. The output generated by the system may be in a different format, for example, as an Alembic (ABC) file or other suitable data structure.

A Start Frame Determination Unit 112 determines that a particular frame of a particular dataset would be used as an initial frame or start frame or an anchor frame for further calculations or tracking. Optionally, a first frame in a sequence of frames may be used; or a randomly selected frame may be used; as the system may subsequently ensure to track points across all the frames in the dataset, including frames that precede the "initial" frame and/or that follow it, in a cyclic manner.

A Set-of-Points Selector 113 operates to detect and select a uniform set of points in the initial frame. The selection may be performed based on color identification or color properties, or based on other pixel properties (e.g., contrast, brightness, hue, saturation, RGB values, CMYK values, or the like). For example, a three-dimensional volumetric dataset of a dancer may be processed by the system which detects a first set of yellow colored pixels (corresponding to a yellow shirt that the dancer wears), a second set of red colored pixels (corresponding to red pants that the dancer wears), a third set of pink colored pixels (corresponding to the head of the dancer), a fourth set of brown colored pixels (corresponding to the hair of the dancer), and a fifth set of blue colored pixels (corresponding to the shoes of the dancer). As the dancer moves or spins or rotates, or as the three-dimensional volumetric dataset reflects the three-dimensional properties of such dancer, the system of the present invention tracks the same points across multiple frames and across multiple viewpoints or views.

For example, a Cluster Detector 114 defines or determines a cluster of specified points in the initial frame (or, in subsequently processed frames) that share similar properties to each other. For example, it may define a first cluster of the yellow colored pixels (the shirt), a second cluster of the red colored pixels (the pants), and so forth. In some embodiments, optionally, a group of pixels are determined to have the same "color" if their RGB values are sufficiently-close (e.g., by not more than N percent) to each other and/or to a pre-defined anchor value. For example, a first pixel having RGB values of (255, 0, 0) is determined to be "red"; and similarly, a second pixel having RGB values of (255, 1, 2) and a third pixel having RGB values of (254, 0, 3) are determined by the system to be "sufficiently close" to the anchor "red" in order to be clustered together; such that those three pixels may be grouped or clustered together even if they do not share the same exact RGB values. In some embodiments, the clustering or grouping may further take into account the relative distance among or between pixels; such that, for example, if the above-mentioned three pixels are neighboring each other, but a fourth "red" pixel that is located 350 pixels away from them, then the fourth "red" pixel may not be part of their cluster. Other suitable conditions or criteria may be used for the clustering process; and particularly in order to reduce errors in point linking.

A Neighboring Point Detector 115 searches for neighboring points relative to the initial Set of points that were selected by the Set-of-Points Selector 113 within the same cluster as defined by the Cluster Detector 114. In some embodiments, a "neighbor point" or a "neighboring point" should necessarily be immediately adjacent to at least one other point of the cluster; whereas, in other embodiments, two points may still be regarded or classified as "neighboring points" if they have a distance of up to N pixels (or points) between them.

Additionally or alternatively, in some embodiments, a Mesh Analysis Unit 116 may utilize and analyze an already-created mesh; for example, as points that are specified in the linking stage may be used as guides. Using an already-existing mesh may be more sensitive to volatility over longer frame ranges with large disparities in movement.

In some embodiments, optionally, a Body Part Segmentation Unit 117 may identify or recognize and perform body part segmentation or body part identification. This may be performed using one or more suitable algorithms; for example, using a Neural Network, using computer vision algorithms, using an image-based search or a shape-based search (e.g., an elongated rectangle may be an arm or a leg; a circle may be a face; or the like), using comparisons to a pre-defined list or set or training-set of images or image-portions that correspond to body organs or body parts, or the like. In some embodiments, optionally, additional smoothing may be automatically performed by the system if it detects or estimates that two segments (e.g., arm and chest) are located closed to each other or touching each other (or, in a distance that is smaller than N pixels from each other); in such situations, the system may need to re-calculate some (or all) of the points or their neighboring points, in order to ensure where exactly one body part ends (e.g., the arm) and where exactly the other body part starts (e.g., the chest); and additional iterations of point tracking, point discarding and/or point clustering may be used for this purpose.

The segmented or identified body parts, as well as corresponding vector directions and magnitudes, may allow the Neighboring Point Detector 115 to determine point properties that distinguish neighboring points from becoming interlinked or unified; or may otherwise be used for verification or validation of a tracked point or of multiple tracked point; or alternately, may be used to determine that a previously-estimated point does not belong within a particular cluster (for example: an original clustering process has grouped together a particular cluster of points; the body part segmentation has determined that this cluster corresponds to an arm of a person; however, a particular point in that original cluster causes such arm to appear deformed or abnormal and therefore that particular point may be discarded or omitted or otherwise corrected or replaced).

A Kinematic Data Determination Unit 118 may determine kinematic data involving skeletal position and movement, for example, by extrapolation from body pose estimations generated by a Body Pose Estimator 119 using the above-described method(s) and/or other methods. The kinematic data may be extrapolated or deduced or determined based on geometric rules or conditions, taking into account the position and/or the velocity and/or the change-in-position of a particular point or a particular group of points or body organ or body part, and deducing from such data the estimated movement or estimated position of other point(s).

As demonstrated in FIG. 2, which shows a "tennis swing" example, (e.g., a hand sliding across a surface or through a space), without proper clustering by the Cluster Detector 114 based on properties of points, any point that is closest to the hand may be incorrectly linked to the hand itself, thereby resulting in an aggregation of unwanted points or a set of points that are incorrectly attributed to be part of the hand while they are in fact not part of the hand. Instead, ad in order to avoid such incorrect classification or evaluation of points, a Filtering Unit 120 may perform filtering of points, by filtering-in and keeping only points that remain in their correct position when a linking step is performed.

A Tracking/Backtracking Unit 121 performs tracking and backtracking of points across frames, each frame analyzed from multiple views or viewpoints; such that the tracking is performed firstly in the forward direction and then in the backward direction (or vice versa) for verification or validation of the results. The backtracking is performed particularly in order to reduce or prevent errors or "false positives". For example, points are tracked both forward (e.g., in frame number N, relative to frame number N+1 and then frame number N+2 and then frame number N+3) and backward (e.g., then, from frame number N+3, back to frame number N+2, then back to frame number N+1 and then back to frame number N). Points that remain within a pre-defined threshold value of difference, are maintained or kept as part of the solved model; whereas other points that are not within the pre-defined threshold value of difference are discarded or omitted or replaced.

A Vanishing Point Remover 122 operates to further remove "false positive" errors, by searching for, and finding, and then removing any "vanishing points" that occur through the calculation step, and which appear in a particular frame of the model but do not appear again at the expected location or area or region in another frame of that model; thereby ensuring (and resulting in) a uniform point count for the duration of tracked frames of the same model.

Figure 3:
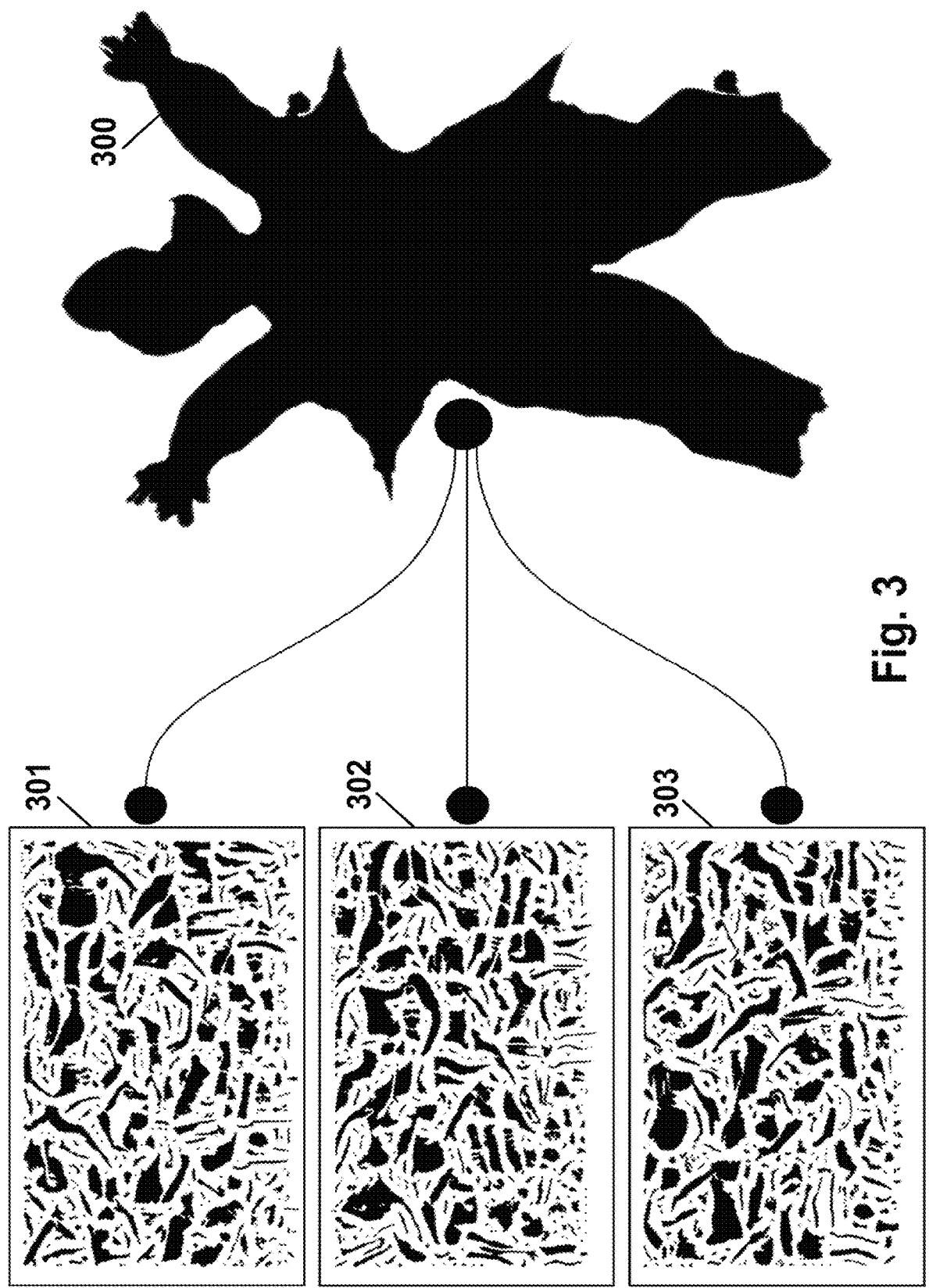
FIG. 3 is a schematic illustration of graphical representations as processed and generated, demonstrating side by side illustrations of texture and point position data, in accordance with some demonstrative embodiments of the present invention.

The three-dimensional component may be introduced to the optical flow through an overlaid point-pass obtained from volumetric data. For example, human pose estimation may be performed by the Body Pose Estimator 119, as an additional step in solving for point data, and is useful for data-sets that are low on contrast and/or that do not track well across multiple frames and/or views. This may be done by using paired cameras and epipolar correspondences, as body landmarks or body regions or organs (e.g., as demonstrated in FIG. 3, which is a schematic illustration of graphical representations 300-303 as processed and generated by the system, demonstrating side by side illustrations of texture (300) and point position data (301-303) in accordance with some demonstrative embodiments) are identified and then used to generate surrounding points which aid in the solving step for uniform points. Optionally, this may be performed by assigning to limbs (or other body organs) a root matrix from which other points generate, thereby allowing for correct rotation in areas of articulation, such as knees and elbows. A third view is introduced to the stereo pair estimation of 3D positions from a Neural Network based pose estimation, or from other suitable algorithms that outputs pose estimation and/or body part recognition insights, as a means for validating or verifying an already-solved points or for evaluating an unsolved point.

In some embodiments, two main scenarios may apply in which this view is deferred to: (i) the 3D point that is re-projected is equal to or greater than a threshold limitation of the confidence value (e.g., in a range of 0 to 1); or alternately, (ii) the pose-estimated point is below the specified threshold limitation of the confidence value. For example, an erroneous result from a 3D re-projected point can occur when pose estimations are vastly different between multiple views, which may occur due to partial visibility or overlap of limbs or other body organs (e.g., a dancer's right arm hides her left arm, from a particular viewpoint and/or due to a particular three-dimensional dancing position maintained by the dancer). Reprojection error thresholds may be specified or pre-defined, and may be normalized based on pre-defined normalization rules or range, for example, based on screen space coordinates or other normalization basis or range. The above operations may optionally be implemented, for example, via a Point Re-Projection and Validation Unit 123.

Solved and validated points may then be meshed by using Poisson surface reconstruction, applied via a Surface Reconstruction Unit 124; and are then transferred or converted into UVs or UV-map using a UV-mapping process, such as, Boundary First Flattening (BFF) or other suitable process implemented by a UV-Map Generator 125. The mesh is subdivided and then re-projected onto an underlying capture, via a Mesh Sub-Divider/Re-Projector 128. The original volumetric data is compared against the generated mesh, for example, using a Hausdorff distance algorithm or other suitable comparison algorithm implemented via an Integrity Checker 126 (or Integrity Comparator Unit), to measure or check or estimate for the integrity and/or correctness of the solved mesh. New mesh generation or re-generation or correction may be performed or may occur in various scenarios, for example, if a subject is changing mass or volume (e.g., a person removes his jacket). When the integrity comparison process indicates that a threshold value of difference is exceeded, new or alternate points may be computed, tracked and generated by a Points Generation/Updating Unit 127, and the uniform solve process resets and is accounted for in mesh reconstruction.

System 100 utilizes and provides temporal coherence between frame data, thereby enabling various advantages when post-processing such data; for example, a significant reduction in file size or storage size that is required for storing the volumetric dataset(s) involved, and in some embodiments approximately an order of magnitude reduction in file size or storage size, such that a uniform mesh is represented by about one-tenth of the size of the original volumetric data-set(s) of the model. For example, FIG. 3 demonstrates the ability of the system of the present invention to convert or transform a non-uniform mesh into a uniform mesh having temporal-coherence.

Furthermore, taking into account also the ability to interpolate, this approach of the present invention may amount to less data required for storing or representing vertices with predictable trajectories. Additionally, kinematic data involving skeletal position and movement may be extrapolated from body pose estimation using the above-mentioned method of paired feature epipolar correspondence of points.

Some embodiments of the present invention may further enable to apply to the 3D model various visual effects or animation effects, via an Effects Applying Unit 129, that are not available for a mesh generated by non-uniform solution for volumetric capture (e.g., due to the inconsistency of data per frame, such data is unavailable and dynamic effects such as clothes or particles interacting with the captured subject cannot be simulated in a conventional mesh non-uniform representation).

Some embodiments of the present invention may enable the system to treat volumetric capture as a process that is native to the 3D workflow, with computer-generated characters that would contain consistent mesh data and the underlying bone structures driving them. Since coherent solved mesh vertex positions are known, the correct motion vectors may be efficiently or correctly generated, thereby allowing for a variety of dynamic effects that interact with (or otherwise affect) the subject's motion. For example, a Subject/Object Interaction Unit 130 may enable to create or emulate or simulate interaction between a subject and an object; e.g., representation of a character twirling forward may be generated, using the solved mesh motion vector data such that a cloth simulation would interact with the subject as it moves forward while such cloth is contouring and sliding against the subject. Such an interaction may also be generated for real-time or near-real-time use, with the user or the Subject/Object Interaction Unit 130 setting objects in the subject's path and allowing such objects to create or cause dynamic reactions (e.g., the twirling subject colliding with a mesh placed nearby, at the click of a button).

In some embodiments, deformation of meshes with established topology may be utilized as another source for input and/or for determining or estimating or detecting properties of points or for otherwise improving or validating the solution. For example, vertices from the mesh are used as the initial set of points that are utilized for searching for a nearest correspondence. Coverage of tracked 3D optical flow points should be within a distance threshold relative to the input mesh. If a new mesh shape is introduced (such as a head) yet it occupies the same spatial volume as its dynamic volumetric capture, then the newly introduced mesh shape (e.g., the head) will follow tracked points just as the dynamically generated points would. If, along the meshing process, the integrity check mentioned above does not pass, then the mesh is regenerated or is otherwise corrected.

In some embodiments, the mesh may be re-generated using point data that is obtained prior to the linking step and/or from the linking step. For example, a new set of points is chosen and then re-linked, optionally by using a different linking method from the previously-used or the most-recently-used linking method, or optionally by clustering together a different set of points, or optionally by removing from a previous initial cluster at least one point, or optionally by randomly selecting a single point or a set of points that are removed or replaced prior to mesh re-generation, or optionally by utilizing and/or applying and/or selecting defined or specified or dynamically-defined or pre-defined rules of point discarding or point replacement for the purpose of mesh re-generation (e.g., a rule of "discard or un-link the point located at the most upper-left side of the first frame, and then re-generate the mesh without it"), or using a combination of two or more mesh re-generation rules or techniques. The meshing may be performed through Poisson surface reconstruction; and the second (or third, or fourth, or subsequent) attempt of mesh re-generation may utilize a new or different or slightly-different set of points in order to avoid compounding of erroneous motion vectors. Optionally, the mesh re-generation may be performed iteratively or repeatedly, until an Integrity Check stage is passed, or until a pre-defined or a specified threshold value that indicates integrity is reached.

Some demonstrative scenarios where the supplied meshes dimension are vastly different from the volumetric capture may further increase the chance of error when looking up neighboring correspondences. It is noted that in some embodiments, creative modifications to the capture appearance, such as the enhancing or minimization of features, should be left to the resultant coherent mesh in order to better maintain stability and/or to achieve optimal results or improved results.

In some embodiments of the present invention, in addition to (or instead of) obtaining skeletal movement of a subject, other movements and/or more intricate movements (e.g., finger articulation) may be obtained using one or more methods, such as by using paired epipolar correspondences, based on a reference video of the subject in sufficiently high fidelity or high quality or high resolution. The underlying volumetric capture may usually provide sufficient information for most purposes, but (in some scenarios) may over-generalize in shape and form, thereby resulting in large "blobs". Such capabilities are absent with some types (e.g., "prosumer" type) of capture equipment, such as Xsens equipment, which represent hand gestures as a single shape and requires specialized hardware to be worn by a captured subject in order to capture intricate data.

In some embodiments, system 100 further comprise a Pose Matching Unit 131, which may operate to improve the accuracy or reliability of the output data and/or which may operate to expedite the processing of the input data, as well as for generation of insights and analysis results that may assist the other units of the system in performing their processing. For example, keyframes/pose may be matched based on vector motion (e.g., taking into account kinematic data or constraints, as well as morphing) using an interpolation or other suitable analysis which may be based on a Neural Network that takes into account the skeleton base motion. The Pose Matching Unit 131 may, in some embodiments, detect or determine or recognize joints or body organs or limbs or appendages or other body parts of a human subject that is represented in the dataset; and may further correlate or match or associate between, for example, (i) a set of vectors or vector motions that are represented in a frame or in a dataset-portion, and (ii) a particular pose or posture or spatial positioning or spatial arrangement of such joints or limbs or appendages or body-parts or body-organs (e.g., recognizing that the human is standing, or sitting, or crawling, or the like). Such information may then further be utilized by the system; for example, since if the system determines that the depicted human is in a sitting position, then the system may further check that the vectors (or linked points) that are associated with hip are generally perpendicular to the vectors (or linked points) that are associated with the leg, or that they are at a particular angle relative to each other (e.g., an angle in the range of 45 degrees to 135 degrees), or that at least they are not in the range of 170 to 180 degrees relative to each other as such range is typically associated with a standing pose and not a sitting pose. These are only some non-limiting examples of the processing which may be improved or performed via such pose matching.

Some embodiments may optionally comprise and/or utilize a Vector Motion Unit 132, such that a static mesh may be driven by original kinematic motion and maps deformation. For example, numerous vectors of the model may move in space over time, as represented in the dataset. The system may select, for example, a single static pose or posture of the subject, and may analyze its data to deduce or detect the skeleton structure and organs location and identification (e.g., arm, hand, leg, hip, appendages, limbs, or the like); thereby enabling the system to later animate (or spatially move) the representations of such limbs or appendages or body organs or body-parts. This may remove or discard or reduce the "noise" or inaccuracies which may exist when trying to spatially animate or spatially move numerous vectors (e.g., 600 vectors), and instead spatially animating or spatially moving a reduced-number (e.g., 16 or 20 or 24) of representations of such limbs or appendages or body-parts or body-organs.

In some embodiments, a Uniform Mesh Reconstructing Unit 133 may enable a user to initiate re-construction or "re-baking" of a uniform mesh; for example, based on a single initial modification or based on a set of initial modifications, that are performed in a single initial frame or alternatively in multiple frames; thereby generating a replacement or an updated version or a modified version of the uniform mesh, in terms of topology and UV meshing, which takes into account the applied modification(s). For example, an original uniform mesh output may correspond to a human dancer; a developer or graphic designer or other user may apply a particular modification to one or more properties or regions (e.g., by changing or narrowing or reducing a waist-line of the dancer as it appears in an initial frame); and the mesh reconstruction unit may then be instructed to reconstruct or "re-bake" a modified uniform mesh based on that particular modification (or set of modifications) which are applied by the system to all other frames and/or to the entire dataset.

In some embodiments, a Layered Motion Deformation Unit 134 may operate to enable or perform modification of motion data through deformers or manipulators or other modifiers (or constraints), thereby enabling to augment subject movements. Such manipulators or modifiers or constraints may represent vectors link connections or constraints, or may indicate that a particular set of vectors should move spatially in accordance with a particular motion scheme or motion constraints. In a first example, an indicator that a first group of vectors corresponds to "left hand", and a second group of vectors corresponds to "left arm" of the same human subject, may later be used by the system to ensure that these two components are moved spatially in general uniformity, and to avoid a situation in which spatial movement of the "left hand" vectors causes them to disconnect from (or to be far from) the "left arm" vectors". In a second example, an indicator that a first batch of vectors corresponds to a "human", and that a second batch of vectors corresponds to a "swing" that the human is sitting on and swinging on, may be utilized by the system in order to ensure that spatial movements of the human subject (e.g., moving his feet while swinging) are still within the spatial realm of the general pendulum motion of the swing, and to avoid erroneous displacement of either the human or the swing as both of them move spatially.

In some embodiments, a Differentiator/Distinguishing Unit 135 may automatically operate to assist the system in differentiating or distinguishing among two (or more) portions of a volumetric dataset or a three-dimensional representation that correspond to, for example, (i) two or more different regions of an object that are visually identical to each other, or (ii) two or more different regions of an object that are generally similar (but not exactly identical) to each other. In a first example, a cube-shaped or cuboid or box-shaped item or a similarly shaped item (e.g., a shoe box; a Lego block; or the like) may have two sides or two faces or two panels which may be identical to each other, or which may be generally-similar to partially similar to each other. Such similarity of exact equivalency may, in some implementation, cause processing mistakes; as data points that relate to a first of the two (or more) identical regions, may be incorrectly attributed to (or linked or, or clustered with) data points that relate to a second of the two (or more) identical regions. The system may thus analyze the dataset or the three-dimensional representation, and may intentionally and/or automatically inject or add or insert or embed one or more additional features that may assist the system in differentiating between such similar or identical portions. For example, white (or other color) "blobs" or stains or unique shapes may optionally be added by the system onto or into one of the multiple regions, as an additional layer or texture or as additional vectors or data-points, in order to facilitate the distinction or distinguishing or the differentiating among the identical or generally-similar portions or faces or sides or panels or regions. Various suitable methods may be utilized for this purpose. For example, in a demonstrative implementation, frames or images or views of the object may be sorted in a descending order of the number of identified features; and clusters of features are utilized as a criterion for populating a heat-map and for generating such additional "blobs", which the system may then add or remove (e.g., taking into account, for example, the number or the ratio or the size of such blobs, relative to the side or face or panel or image or frame that they are associated with) and/or relative to other blobs or other image-portions (e.g., measured by pixels, or vectors, or as the percentage of the frame that is covered by blobs, or the like).

Figure 5A:
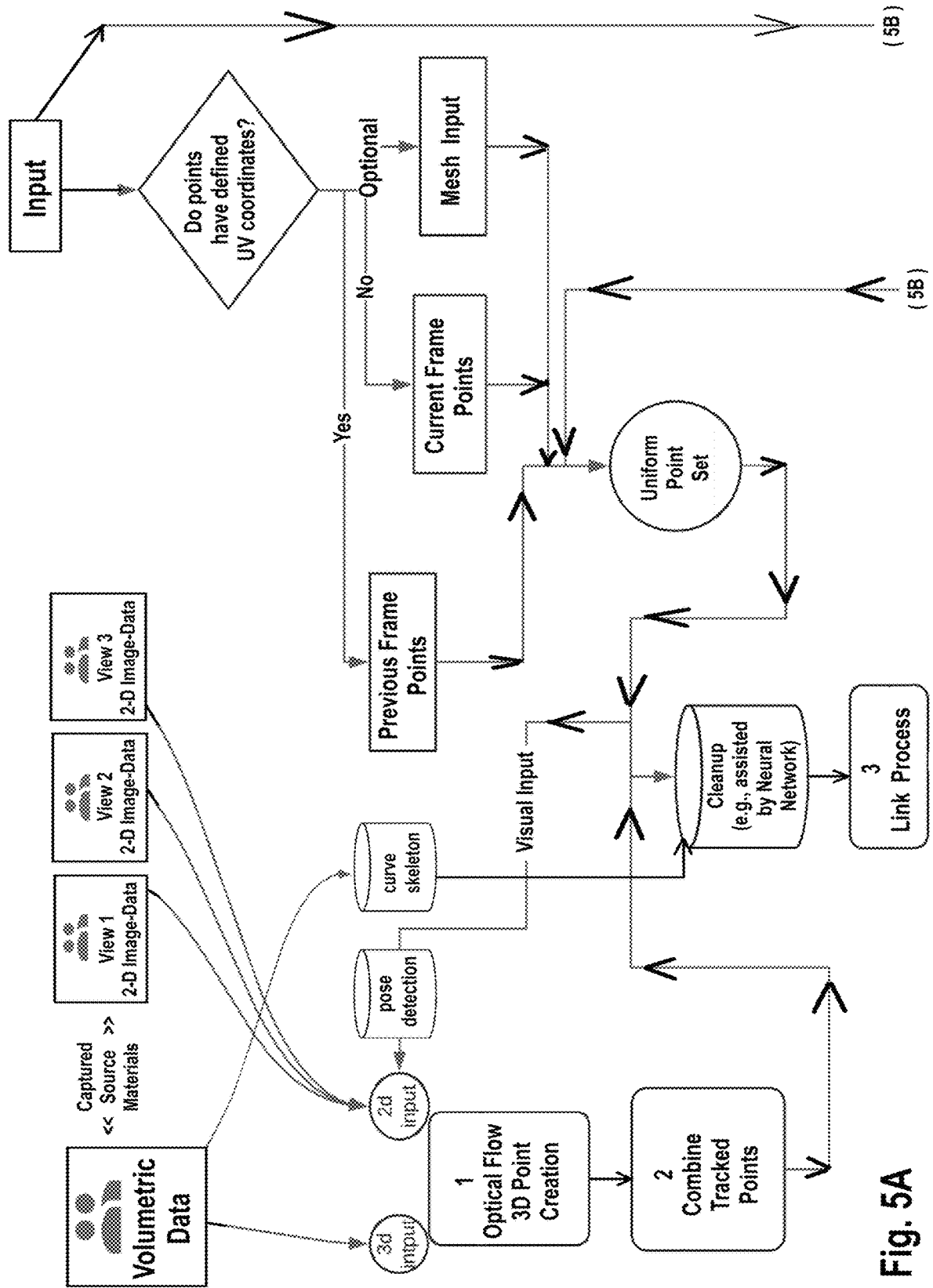
FIGS. 5A and 5B are two parts of a flow-chart of a method, in accordance with some embodiments of the present invention.
Figure 5B:
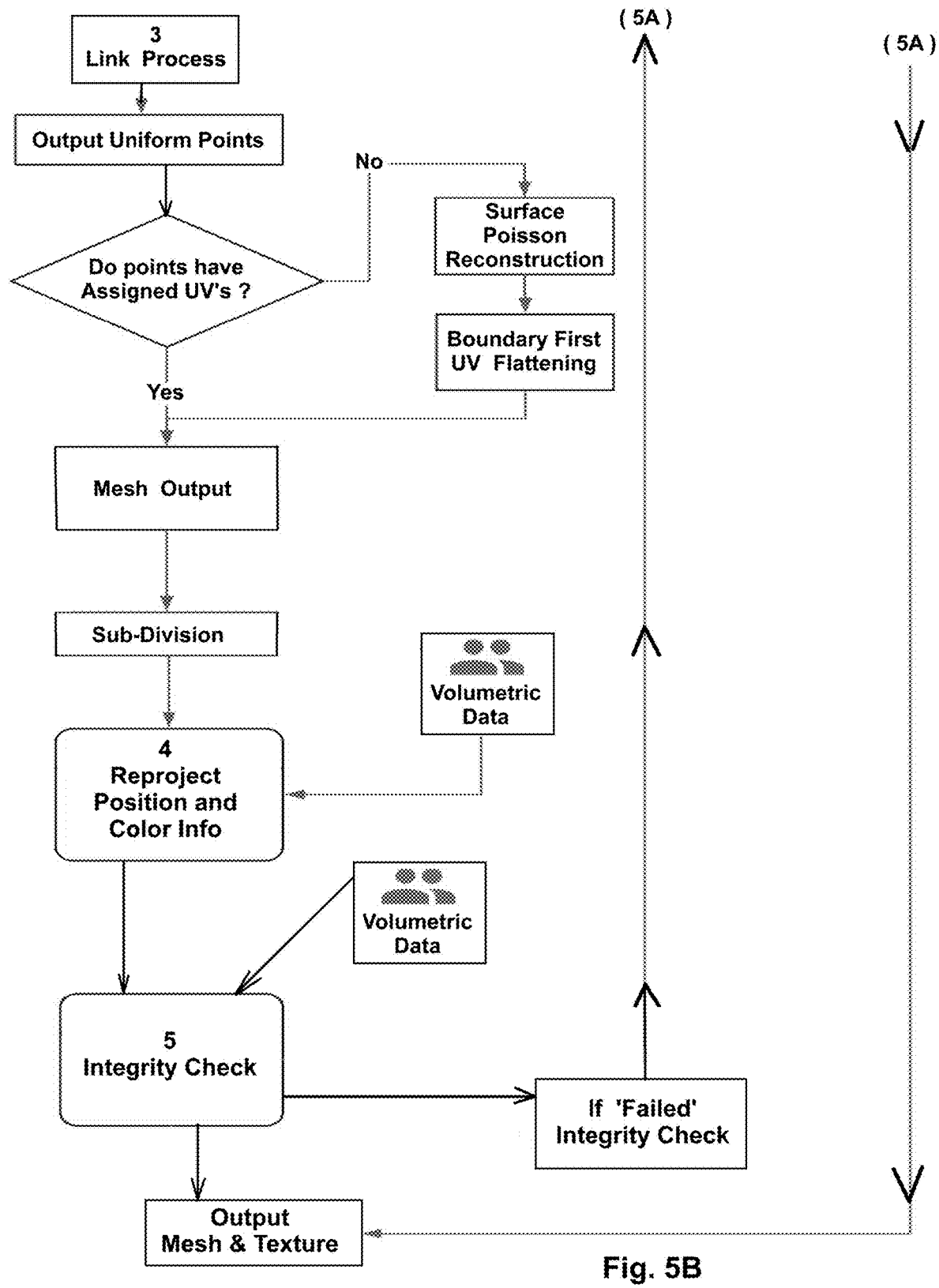

Reference is made to FIGS. 5A and 5B, which are two parts of a flow-chart of a method in accordance with some embodiments of the present invention. The method may be performed by system 100 of FIG. 1, or by other suitable systems or devices; and it reflects or includes the operations described in detail above and/or herein.

As demonstrated on the left side of FIG. 5A, volumetric capture data is received or obtained as 3D input; and multiple view of 2D image data is received as 2D input. The data is processed to perform optical flow 3D point aggregation and/or creation, and tracked points are combined. Optionally, curve skeleton data (e.g., obtained from the 3D and/or 2D input data, optionally using Machine Learning) is utilized for cleanup (and optionally for smoothing). Optionally, visual input and pose detection are applied to the 2D data, to assist in the optical flow 3D point creation and/or in the combining of the tracked points. The cleanup process may utilize a Neural Network (NN), and a link process may be applied. Optionally, a suitable algorithm may be applied for the purpose of smoothing the data, and/or to increase the precision of the data without distorting the signal tendency; such as digital filtering, and particularly, applying a Savitzky-Golay filtering process, for high frequency noise obtained from joined positions, increasing precision while minimizing jitter.

As demonstrated on the right side of FIG. 5A, optionally, the input is also processed to determine whether the points of a frame have defined UV coordinates; and if so, then points of previous frame(s) may be used or re-used, to create a uniform point set that is fed to the cleanup and link processes. If points in the frame do not have defined UV coordinates, then the points of the current frame are used or added to the uniform point set; and optionally, mesh input may be utilized or added for this purpose.

After the link process, the method outputs the uniform points, and checks whether the points have assigned UVs. If not, then the surface reconstruction is performed, as well as automated mapping of UVs (and optionally, boundary-first UV flattening).

Then, the mesh output is generated and a sub-division process is applied; and the method may perform re-projection of position and color information, taking into account the volumetric data, and obtaining attributes of color and positional properties of matching volumetric data. An integrity check process is performed, prior to outputting the final mesh and texture; such as, an integrity check process that is based on the sum of squared distances from the source to the target; and failure in the integrity check (e.g., not reaching a pre-defined threshold level of integrity, or not reaching a pre-defined integrity score threshold value) routes the method to re-generate the uniform point set acknowledging mesh additions and/or removals (e.g., garments, wearable accessories, carried or held accessories, shoes, hats).

In some embodiments, the method utilizes Machine Learning (ML) that classifies a set of points as a particular body organ or body part (e.g., arm, leg, head), optionally based on points of at least four different frames, and/or based on points of at least four different views of the subject.

Figure 5C:
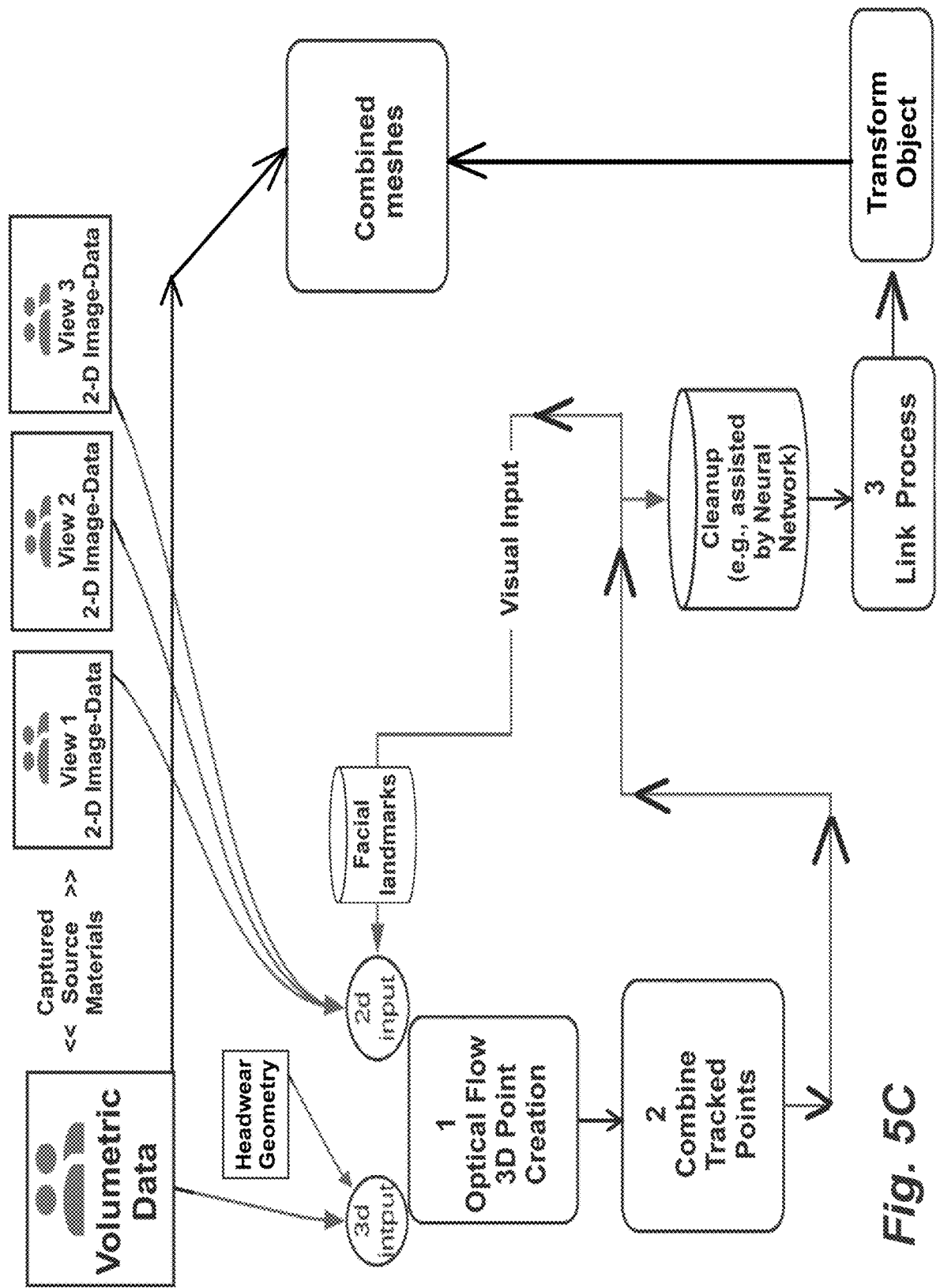
FIG. 5C is an alternate version of the method-portion that is depicted in FIG. 5A, in accordance with some demonstrative embodiments of the present invention.

Reference is also made to FIG. 5C, which is an alternate version of the method-portion that was described in FIG. 5A, in accordance with some demonstrative embodiments of the present invention. As shown in FIG. 5C, optionally, Headgear Geometry data and/or facial geometry data may be utilized as part of the 3D data input, in addition to the 3D volumetric data. Additionally or alternatively, Facial Landmarks are identified from combined tracked points, and are used or re-used as additional 2D data input. Optionally, landmarks of features are utilized as anchors, to reduce drifting and compound error. Furthermore, the volumetric data may be used to generate combined meshes, and/or to generate a combination of geometry data utilizing pose data such as hats or other head-wear or head-gear, based on one or more transformed objects that result from performing the link process on combined tracked points.

The tracking system of the present invention and/or the various operations that are described above may be applicable to (or may be utilized in conjunction with) humans, as well as non humans (e.g., dogs, cats, four-legged animals, quadruped animals) and also inanimate objects or objects that are able to move (e.g., a swing in a playground). In some embodiments, non-human objects may not be subjected to the processing aid of a human-centered neural network or training set; however, similar capabilities may be achievable if the system is provided with sufficiently clear or well-defined criteria for determining frame-to-frame feature correspondences, and/or by utilizing an animal-centered neural network or training set. For example, in some demonstrative embodiments, a cloth is overlaid or placed on a set of objects; first the fabric is stretched forth, and slowly drapes the objects beneath it. In such scenario, the points may be created initially at the start of the frame before tracking begins, as previously described. 3D markers may then be obtained from footage shot from multiple viewpoints. Obtained tracked 3D points may then be aggregated and linked with the initially-generated point set, with the omission of labeling by body part types.

Some embodiments may utilize one or more Graphic Processing Units (GPUs), or one or more Application-Specific Integrated Circuits (ASICs), in order to enable real time or near real time processing of three-dimensional model or objects, and/or in order to enable rapid modification of textures, virtual try-on and virtual modification of clothing based on different clothing designs and/or colorways, rapid virtual dressing and virtual modification of clothing, rapid re-dressing of a volumetric captured avatar (and not only a redressing of a 3D video or a 2D image), rapid clothing effects, rotation and spinning of objects and models, and other suitable modifications or animations. Some embodiments of the present invention may enable rapid and efficient virtual dressing or re-dressing or dress modification; for example, the generated uniform mesh of motion vertex may be utilized as an input to a virtual dressing or virtual re-dressing application or module or unit, which may apply or add or modify a virtual dressing layer on top of the generated model. Optionally, a separate model or texture or data-set may provide the data that characterizes such materialistic properties and/or such virtual dressing items or layers, for example, its color, its thickness, its texture or patterning, the tightness or looseness of such dress relative to the modeled body, or the like; and the virtual dressing or re-dressing process may apply such settings. Furthermore, some embodiments may enable virtual dressing or virtual re-dressing of a three dimensional object or subject or model, while it is also being rotated or animated or otherwise modified in a three-dimensional context; for example, enabling to generate an animation of a dancer that spins on her toe while also, automatically, gradually changing the virtual dress that the animated dancer wears, with a smoothed transition from a first virtual dress to a second virtual dress.

In some embodiments, deformation data or deformation descriptors or deformation coefficients, or other deformation components, are placed atop the resulting uniform mesh output. For example, a deformer is aligned and fitted to the corresponding head/body skeleton position. Motion is applied to the controller deforming the head/body part position. Optionally, for head alignment, a ray is cast from the position of the head to a particular target point or region.

In some embodiments, an optional or external step in the Uniform Mesh creation and handling, and/or in the texture processing, in as an automatic or semi-automated or manual refinement step, performed via a refinement tool or module or unit. For example, texture is stabilized in 2D space (e.g., using a warp stabilization method), and then stabilization data is transferred back to the vertex position in 2D space (e.g., reverse motion) for better alignment of RGB to vertex.

Some embodiments may enable seamless takes. For example, the skeleton generated after processing of a uniform mesh is obtained; and the process takes place when a gap appears within sequence order. In some situations, a user may (e.g., intentionally) interrupt the sequence order, through placing marked key frame of desired movement to direct an existing capture, e.g., bending between different actions, synthetic movements predicated on dataset of sequences captured, or the like. A pose is obtained for start and end point; interpolated positions are determined to occur when dropped frame(s) or frame(s) without a pose are encountered. Optionally, a Machine Learning (ML) model may operate to assist in scenarios where forecasted motion of subjects through interpolation is insufficient, such as a run motion transitioning to a stopped pose. Acceleration values are obtained from designated feature points for use with classification in forecasting movement and then for determining missing poses. The resulting pose is applied to a proxy mesh using graph deformation. Projection applied to the underlying base mesh is updated to reflect the resulting pose of the relevant frame(s).

Some embodiments may utilize an underlying mesh for garment (or clothing) simulation or emulation, by implementing an automated process for cloth simulation on top of post processed and real-time captures. For example, a uniform mesh is generated from the captured data; and the uniform mesh is then projected onto the original capture. A body template is estimated from designated areas selected by garment segmentation (e.g., segmentation of a coat into right sleeve, left sleeve, front side, back side, head cover, and so forth), and this may be performed in most scenarios unless there exists heavy occlusion of key body features (e.g., by a floor-length dress that hides the entire legs and feet of the depicted person). The resulting template mesh is driven by graph deformation utilizing obtained uniform mesh vertices. The output may be transferred to a garment simulation/emulation unit. Optionally, a friction coefficient may be assigned at different areas of the uniform mesh, to reflect that different regions of the simulated garment have a different level of friction relative to the simulated body underneath them; for example, reflecting that a loose sleeve of a coat has less friction with the arm, relative to the friction of a tight scarf around the neck. The generated simulation output may be combined with the raw capture.

Some embodiments may feature a curve skeleton with 3D optical flow tracking. For example, a curve skeleton is derived from normal information obtained from the mesh. A process of generating points includes casting rays into the mesh using reversed normal data, and identifying hits using accelerated lookup structures. Return values that surpass the set angular threshold are registered as a hit, and will store the distance from the hit point to the corresponding ray origin. Points are then placed at the midpoint of each such stored distance. Points within a pre-defined threshold range-of-values are then fitted to a line, using principal component analysis or other suitable line-forming method. Points are iterated again (for two or more iterations) within a threshold, to allow generally even distribution of points while maintaining connection to the surface. Attributes are transferred from or on previous projected points fitted to each line. A confidence value is obtained by utilizing Eigenvalues; wherein higher threshold values indicate minimal divergence from a line fitted to the area. A process that utilizes a resulting condition operates to isolate areas that connect or inter-connect, such as armpits with neck and groin. Classification begins by identifying the torso regression line and sorting lengths. Classified parts are resampled, to ensure an even distribution of segments. When an identified pose meets specified conditions and is identified as valid, a frame number is stored in combination with limb position to test against the next frame(s).

In some scenarios of volumetric captures, hands are crudely represented; yet in some embodiments, such information can be extrapolated from visually salient features within raw footage of the captured subject. In some embodiments, principal component analysis of segmented cloud may also aid in generalizing hand orientation in combination with two-dimensional features retrieved from hand pose estimation, which are then assigned to a template hand mesh.

In some embodiments, obtained re-projected points are compared against the optical flow as a means to detect wayward points solved for the overall shape used in graph deformation. Using nearest neighbor lookup. clusters are assigned from curve skeleton segmentation point(s) re-projected to the original position.

Some embodiments may utilize correspondences of tracked point selected, matched against subsequent frames. Cluster group properties and movement thresh-holds may be used for pruning of false positives.

In some embodiments, the system may identify, detect, recognize, classify and/or isolate multiple separate objects or multiple discrete objects, derived from 2D data and from 3D data; and may perform independent point tracking for each such object, and may generate a separate uniform mesh that corresponds to (or represents, or is associated with) each such object. For example, segmentation or other computer vision analysis of the 2D and 3D data may lead the system to determine that the subject that was captured is not merely a human dancer, but rather, four separate objects: the body of the human dancer, a wand or a stick that the dancer holds and rotates in her hand, the long hair of that dancer which moves in a different manner (e.g., at a slight delay relative to her body movement), and optionally also a particular garment or accessory that the dancer carries or wears or holds; and the system may classify and track, separately, the relevant points of each such object, and may create multiple, separate, uniform meshes that together represent the entirety of the scene that was captured. The system may thus perform secondary object segmentation, derived from multiple views and from 2D and 3D input, to identify and track a secondary object, or a series or set of such secondary objects; such as accessories, hair, garments, hat, items that a human holds, or the like. Using 2D tracking and machine learning, the system may separately identify and separately track different objects in the captured scene, and may create separate uniform meshes for them.

Some embodiments provide a system that operates as a holographic creator studio with a volumetric uniform solver, to enable the creation of a coherent uniform mesh for dynamic objects, with geometric solve for consistent topology for the entire capture duration. Some embodiments may thus provide significant reduction in data size, static texture/UV and geometry manipulators. The system may implement a method for non-temporal atlas and mesh topology, that provides a consistent uniform mesh through the entire capture while preserving all the details from the original data.

In contrast with conventional systems, the system of the present invention may provide faster and/or more accurate results for a consistent mesh through time, together with body/object segmentation and dynamic manipulators. The system may operate even with low frame rates (e.g., 5 or 10 FPS), unlike conventional systems that would yield higher pose disparity at such low frame rates.

Some embodiments may provide the following benefits or features: 70% to 90% lossless data compression in Alembic format; uniform topology through time; uniform UV through time; object and body part segmentation (and optionally, segmentation into accessories, hair, hat, item that is held or carried, secondary objects); Skeleton data; Underlying uniform mesh for dynamic simulations of cloths, hair, particles; Dynamic manipulations (e.g., Look At constraint); Pose matching—tween between poses and textures (e.g., create seamless takes); Mesh Cleanup and smoothing tools.

The Applicants have realized that conventional methods for volumetric mesh compression are limited and/or inefficient, due to keyframe interpolation and/or due to evolving mesh (e.g., every 5 to 25 frames). Such meshes are limited at preserving details, due to mesh tracking that compress minor or detailed motions in relation to the raw data; and conventional systems do not provide an adequate result that is consistent through time. The present invention provides a method for non-temporal atlas and mesh topology, that provides a consistent uniform mesh through the entire capture while preserving all the details from the original data.

Some embodiments provide a virtual dressing tool, enabling to capture real people and virtually dress them in near real time using the Uniform Mesh solver. The system may provide a highly realistic solution to enable high-end CG cloth simulation, based on volumetric videos captures and garment patterns. In combination with real time mobile studio capabilities, some embodiments may provide a complete virtual dressing booth that can be available anywhere.

Fast processing, optionally using a remote server or a cloud computing architecture, may enable the system to rapidly create a uniform mesh from processed volumetric captured data and textures (e.g., around 4 to 8 seconds per frame, when CPU based; and faster if GPU support is added, providing real time or near-real-time processing).

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments of the present invention may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
    (a) receiving a plurality of three-dimensional volumetric datasets that correspond to a particular object;
    (b) generating, from said plurality of three-dimensional volumetric datasets, a single uniform mesh dataset that corresponds to said particular object;
    wherein a size of said single uniform mesh dataset is less than ¼ of an aggregate size of said plurality of three-dimensional volumetric datasets;
    wherein the generating comprises:
    adding a virtual differentiator feature into a particular portion of said particular object, which is spatially tracked over time and across frames, to improve correctness of computer-based tracking of said particular object as it is being animated or redressed;
    wherein adding the virtual differentiator feature is performed by one or more operations selected from the group consisting of:
    (I) adding a particular texture to said particular portion of said particular object,
    (II) adding a particular layer said particular portion of said particular object,
    (III) adding one or more particular vectors to particular portion of said particular object,
    (IV) adding one or more particular data-points to said particular portion of said particular object from a different angle;
    wherein the added virtual differentiator feature is used to perform at least one of:
    (A) distinguishing among two or more portions of a volumetric dataset;
    (B) distinguishing among two or more portions of a three-dimensional representation that corresponds to two or more regions of the particular object that are visually identical to each other;
    (C) distinguishing among two or more portions of a three-dimensional representation that corresponds to two or more regions of the particular object that are similar to each other but are not identical to each other;
    (D) enabling temporal-coherence uniform topology in applying an animation effect to said particular object;
    (E) enabling temporal-coherence uniform topology in applying a texture effect to said particular object.

2. The method of claim 1, comprising:
    generating a three-dimensional animation sequence of said particular object based on said single uniform mesh dataset, based on motion vectors derived from coherent solved mesh vertex positions that are known;
    performing at least one of:
    (i) virtual dressing of said particular object with a particular virtual dress based on a set of virtual dress characteristics;
    (ii) virtual re-dressing of said particular object in which said particular object is modified from being depicted as having a first virtual dress to being depicted as having a second, different, virtual dress.

3. The method of claim 1, comprising:
    determining skeletal movement of said particular object based on analysis of both (i) paired epipolar correspondences and (ii) a reference video clip of said particular object in motion.

4. The method of claim 1, wherein the generating comprises:
    identifying a pose of said particular object based on analysis of a vector motion which takes into account kinematic data and kinematic constraints.

5. The method of claim 4,
    wherein the identifying comprises:
    applying interpolation via a Neural Network that takes into account skeleton base motion, to recognize body parts of a human body that is represented in said three-dimensional volumetric datasets, by matching between: (i) a set of vectors that are represented in a dataset-portion, and (ii) a particular spatial pose of said body parts.

6. The method of claim 1, comprising:
automatically applying a user-selected modification effect to an entirety of said single uniform mesh dataset, to generate a re-constructed modified uniform mesh dataset that reflects a particular user-selected visual modification to said particular object.

7. The method of claim 6,
wherein said applying comprises real-time modification of a clothing texture or a virtual dressing characteristic of said particular subject during a three-dimensional animation sequence of said particular subject.

8. The method of claim 6,
wherein said applying comprises adding a simulated layer of clothing or a virtual dress layer to said particular subject during animation.

9. The method of claim 1,
wherein said single uniform mesh dataset has temporal coherence among frame data;
wherein the method further comprises:
analyzing 2D data and 3D data; identifying at least a primary object which corresponds to a main body of a human; identifying one or more secondary objects, which correspond to an item that said human carries or holds; separately tracking points of each object; generating multiple, separate, uniform meshes for the primary object and for each secondary object.

10. The method of claim 1, comprising:
(A) receiving a separate data-set which provides data that characterizes at least one of:
 (I) a virtual dressing item,
 (II) a virtual dressing layer,
 (III) properties of a virtual dressing item,
 (IV) color of a virtual dressing item,
 (V) thickness of a virtual dressing item,
 (VI) tightness of a virtual dressing item relative to a modeled body,
 (VII) looseness of a virtual dressing item relative to said modeled body;
(B) performing a process selected from the group consisting of: (i) a virtual dressing process, (ii) a virtual re-dressing process.

11. The method of claim 10,
wherein performing said process in step (B) comprises:
performing said process in step (B) while said particular object is being animated or rotated.

12. The method of claim 10,
wherein performing said process in step (B) comprises:
gradually changing, via a smooth transition, a first virtual dress of said particular object, to a second virtual dress.

13. The method of claim 10,
wherein said process in step (B) is performed as part of a virtual try-on process.

14. The method of claim 10,
wherein said process in step (B) is performed as part of rapid re-dressing of a volumetric captured avatar.

15. The method of claim 10,
wherein said process in step (B) comprises:
performing virtual dressing modification by utilizing as input a uniform mesh of motion vertex.

16. The method of claim 1, comprising:
based on said uniform mesh dataset, applying a visual effect or an animation effect.

17. A non-transitory storage medium having stored thereon instructions that, when executed by a hardware processor, cause the hardware processor to perform a method comprising:
(a) receiving a plurality of three-dimensional volumetric datasets that correspond to a particular object;
(b) generating, from said plurality of three-dimensional volumetric datasets, a single uniform mesh dataset that corresponds to said particular object;
 wherein a size of said single uniform mesh dataset is less than ¼ of an aggregate size of said plurality of three-dimensional volumetric datasets;
 wherein the generating comprises:
 adding a virtual differentiator feature into a particular portion of said particular object, which is spatially tracked over time and across frames, to improve correctness of computer-based tracking of said particular object as it is being animated or redressed;
 wherein adding the virtual differentiator feature is performed by one or more operations selected from the group consisting of:
(I) adding a particular texture to said particular portion of said particular object,
(II) adding a particular layer said particular portion of said particular object,
(III) adding one or more particular vectors to particular portion of said particular object,
(IV) adding one or more particular data-points to said particular portion of said particular object from a different angle;
 wherein the added virtual differentiator feature is used to perform at least one of:
(A) distinguishing among two or more portions of a volumetric dataset;
(B) distinguishing among two or more portions of a three-dimensional representation that corresponds to two or more regions of the particular object that are visually identical to each other;
(C) distinguishing among two or more portions of a three-dimensional representation that corresponds to two or more regions of the particular object that are similar to each other but are not identical to each other;
(D) enabling temporal-coherence uniform topology in applying an animation effect to said particular object;
(E) enabling temporal-coherence uniform topology in applying a texture effect to said particular object.

18. The non-transitory storage medium of claim 17,
wherein the method comprises:
(A) receiving a separate data-set which provides data that characterizes at least one of:
 (I) a virtual dressing item,
 (II) a virtual dressing layer,
 (III) properties of a virtual dressing item,
 (IV) color of a virtual dressing item,
 (V) thickness of a virtual dressing item,
 (VI) tightness of a virtual dressing item relative to a modeled body,
 (VII) looseness of a virtual dressing item relative to said modeled body;
(B) performing a process selected from the group consisting of: (i) a virtual dressing process, (ii) a virtual re-dressing process.

19. A system comprising:
one or more hardware processors that are configured to execute code,
operably associated with one or more memory units that are configured to store code;

wherein said one or more hardware processors are configured to perform a computerized process comprising:
(a) receiving a plurality of three-dimensional volumetric datasets that correspond to a particular object;
(b) generating, from said plurality of three-dimensional volumetric datasets, a single uniform mesh dataset that corresponds to said particular object;
wherein a size of said single uniform mesh dataset is less than ¼ of an aggregate size of said plurality of three-dimensional volumetric datasets;
wherein the generating comprises:
adding a virtual differentiator feature into a particular portion of said particular object, which is spatially tracked over time and across frames, to improve correctness of computer-based tracking of said particular object as it is being animated or redressed;
wherein adding the virtual differentiator feature is performed by one or more operations selected from the group consisting of:
(I) adding a particular texture to said particular portion of said particular object,
(II) adding a particular layer said particular portion of said particular object,
(III) adding one or more particular vectors to particular portion of said particular object,
(IV) adding one or more particular data-points to said particular portion of said particular object from a different angle;
wherein the added virtual differentiator feature is used to perform at least one of:
(A) distinguishing among two or more portions of a volumetric dataset;
(B) distinguishing among two or more portions of a three-dimensional representation that corresponds to two or more regions of the particular object that are visually identical to each other;
(C) distinguishing among two or more portions of a three-dimensional representation that corresponds to two or more regions of the particular object that are similar to each other but are not identical to each other;
(D) enabling temporal-coherence uniform topology in applying an animation effect to said particular object;
(E) enabling temporal-coherence uniform topology in applying a texture effect to said particular object.

20. The system of claim 19,
wherein the computerized process comprises:
(A) receiving a separate data-set which provides data that characterizes at least one of:
(I) a virtual dressing item,
(II) a virtual dressing layer,
(III) properties of a virtual dressing item,
(IV) color of a virtual dressing item,
(V) thickness of a virtual dressing item,
(VI) tightness of a virtual dressing item relative to a modeled body,
(VII) looseness of a virtual dressing item relative to said modeled body;
(B) performing a process selected from the group consisting of: (i) a virtual dressing process, (ii) a virtual re-dressing process.

\* \* \* \* \*